(12) United States Patent
Hees

(10) Patent No.: US 7,296,786 B2
(45) Date of Patent: Nov. 20, 2007

(54) COMPOSITE BUSHING HAVING DUAL DAMPING CAPABILITY

(75) Inventor: Erich Hees, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 28 days.

(21) Appl. No.: 10/997,773

(22) Filed: Nov. 23, 2004

(65) Prior Publication Data

US 2006/0108727 A1    May 25, 2006

(51) Int. Cl.
*B60G 11/22* (2006.01)
(52) U.S. Cl. .................. 267/293; 267/140.3; 267/140.5
(58) Field of Classification Search ............. 267/140.3, 267/140.5, 293, 292, 276, 153
See application file for complete search history.

(56) References Cited

U.S. PATENT DOCUMENTS

| | | | |
|---|---|---|---|
| 2,958,526 A * | 11/1960 | Ulderup et al. ............. | 267/292 |
| 5,224,790 A | 7/1993 | Hein | |
| 5,984,283 A | 11/1999 | Tsuiki et al. | |
| 6,419,215 B1 | 7/2002 | Johnson et al. | |
| 6,474,631 B2 | 11/2002 | Hadano et al. | |
| 6,540,216 B2 * | 4/2003 | Tousi et al. ............... | 267/140.3 |
| 6,845,994 B2 * | 1/2005 | Cai et al. ............... | 280/124.107 |
| 6,845,995 B2 * | 1/2005 | Cai et al. ............... | 280/124.169 |

* cited by examiner

*Primary Examiner*—Bradley King
(74) *Attorney, Agent, or Firm*—Carrier, Blackman & Associates, P.C.; William D. Blackman; Joseph P. Carrier

(57) ABSTRACT

A composite bushing including an outer sleeve coaxially surrounding an inner sleeve, and including an elastomeric body extending between the outer sleeve and the inner sleeve. The elastomeric body is provided with circumferentially alternating wedge sections having different physical characteristics, so as to provide a bushing having directional differences in resistance to deflection. The resiliency in a first radial direction appreciably differs from the resiliency in a second radial direction, where the second radial direction is at an angle to the first radial direction. The resulting bushing configuration can be used to attenuate vibration and noise in a vehicle, and thereby contribute to improved vehicle handling and ride comfort.

20 Claims, 3 Drawing Sheets

COMPOSITE BUSHING HAVING DUAL DAMPING CAPABILITY

BACKGROUND OF THE INVENTION

1. Field of the Invention

The present invention relates to bushings, which are extensively used in a variety of assemblies within automobiles, particularly in suspension systems. More specifically, the present invention relates to a sectioned composite bushing having directionally variable dampening properties. In addition, the inventive bushing is characterized by inner and outer cylindrical collars bridged by circumferentially arranged elastomeric sections. The inventive bushing attenuates vibration and noise transmitted through metal structures.

2. Description of the Background Art

In today's automotive industry, extensive time and effort has been expended to reduce vibration, and vibration and friction-induced noise in vehicles, while improving ride comfort and vehicle handling. Technologically refined vibration isolators and resilient bushings have been developed to achieve better vibration isolation and noise control, and are commonly employed between interrelated structural components. A number of bushings are known in which a resilient annular cylinder is fitted between two coaxial sleeves. The resilient annular portion of the bushing permits components of a suspension system that are connected to the inner sleeve and the outer sleeve, respectively, to move toward and away from each other in the radial direction with respect to the bushing axis, while the elastomeric portion dampens the initial harshness of the motion.

Preferably, the elastomeric member is designed to permit a large deflection in the radial direction, so that the elastomeric material can absorb large loads or shocks, without damaging the surrounding components. However, deflection of the bushing in the axial direction is undesirable, because such deflection causes axial spreading and consequent misalignment of the suspension system components. Axial deflection also has adverse effects upon the bushing, since it tends to weaken the mechanical bond between the compressed elastomeric member and the respective inner and outer sleeves.

Typically, this type of known bushing includes at least two concentric rigid cylindrical collars (sleeves) with an annular elastic member interposed between them. The inner sleeve is securely connected to one structural component, while the outer sleeve is secured to another structural component. Generally, the sleeves are formed of metal, while the annular elastic member is of a flexible, resilient material such as rubber. In the automotive industry, such resilient bushings are incorporated in frames and others parts to dampen the dynamic vibration of metal structures. They are also utilized to generate high noise impedance in what might otherwise be an all-metal path for the transmission of structure-borne sounds in a metal structure.

A few illustrative examples of previously known resilient composite bushings are described in U.S. Patents issued to Hadano et al., Johnson et al., Tsuiki et al., and Hein.

In U.S. Pat. No. 6,474,631, Hadano et al. discloses a cylindrical stabilizer bushing with a main body elastic rubber member. The rubber elastic member has a radially layered structure comprising an inner rubber layer having with high sliding properties and an outer rubber layer integrally laminated on the outer surface of the inner layer rubber. This construction allows vulcanized bonding of the inner sliding rubber portion to the outer, main body rubber portion, even if the sliding rubber portion material is injected when the vulcanization of the main body rubber portion is almost complete.

In U.S. Pat. No. 6,419,230, Johnson et al. reveal a suspension bushing with a sleeve. The sleeve member includes an inner surface and a cavity. A core member is disposed inside the cavity. In addition, two elastomeric members are also disposed inside the cavity. The first elastomeric member is positioned adjacent to the core, while the second elastomeric member is interposed between the first elastomeric member and the inner surface. The first elastomeric member has a modulus that is greater than that of the second elastomeric member, so that one of the elastomeric members absorbs low frequency vibration, while the other elastomeric member absorbs high frequency vibration. As seen in the previous reference, an outer elastomeric member is concentrically surrounding an inner elastomeric member.

Tsuiki et al., in U.S. Pat. No. 5,984,283, disclose a stabilizer bushing for use as component of a vehicle suspension system. The subject bushing is provided with a vibration damping main body. This main body comprises a resilient, thick-walled cylindrical body, formed of rubber, which defines a stabilizer bushing. The resilient body is obtained by inserting a rubber cylindrical inner body into a rubber cylindrical outer body. The outer body acts as a main part of the resilient rubber body. The inner surface of the inner rubber body has high sliding characteristics, and acts as a slide surface that is adapted to hold a stabilizer bar.

In the U.S. Patent to Hein (U.S. Pat. No. 5,224,790), a bushing assembly with axial restraint properties is disclosed. The bushing assembly of Hein includes an outer sleeve encircling an inner sleeve that contacts a stabilizer bar. The outer sleeve is formed of a more flexible material than the inner sleeve. The nesting sleeves are designed to restrain axial movement, while allowing ease of rotational movement. The outer sleeve engages and at least partially surrounds an inner sleeve. The inner sleeve is designed to surround and engage a metal stabilizer bar. The engagement of the stabilizer bar by the inner sleeve is designed to inhibit relative axial movement between the stabilizer bar relative and the inner sleeve. The inner diameter of the inner sleeve includes a high-friction surface, such as knurling, or even an adhesive engagement of the inner sleeve to the stabilizer bar.

Primarily, the known background art, including the references cited herein, use concentrically disposed and radially stacked concentric layers of elastomeric material to provide composite bushings. Although the reference patents teach combining rubber materials of differing resiliency to offer an improved bushing, which results in improved vehicle comfort and handling, they achieve this goal by providing concentric layering of elastomeric components in a radial direction. However, when the composite is formed in this configuration and is placed under a radial load, one layer of rubber with a particular resiliency transfers its unique physical attributes to radially adjacent layer(s) of a different resiliency.

Hence, the bushings disclosed in the references are unable to derive the benefits from the attributes of one particular layer having a specific resiliency, because of the interdependence with the other radially disposed layer(s) having a different resiliency. Since each of the bushings described above uses a structure composed of elastic materials of differing elasticities radially disposed in concentric layers, the dampening effect they provide is a result of the combined elasticities of the layers. Controlling the resulting damping effect can be difficult.

A composite bushing is needed that optimally uses a plurality of elastic elements of differing elasticities, disposed in such a manner that the physical characteristics of one elastic element can be experienced substantially independently of the influence of adjacent elastic elements. A composite bushing is needed wherein the resiliency is directionally dependent, such that the bushing provides a plurality of elasticities, wherein a specific resiliency is associated with a specific direction of applied load. A composite bushing is needed that, when used to attenuate vibration and transmitted noise in an automotive assembly, provides improved vehicle handling and ride comfort.

SUMMARY OF THE INVENTION

In accordance with an illustrative embodiment of the present invention, a composite bushing is provided having an elastomeric annulus which is radially sectioned, to provide plural wedge-shaped elastic members. Selected individual elastic members have a specific resiliency which varies from other elastic members. The wedge-shaped members cooperate to provide an annulus having circumferentially varying resiliency. As a result, the inventive bushing provides a variable resistance to deflection, which depends upon the direction of the applied load.

More specifically, illustrative embodiment of the present invention provides a radially sectioned bushing in which the resiliency in a first radial direction differs significantly from the resiliency in a second radial direction, where the second radial direction is at an angle to the first radial direction. The resulting bushing configuration, when used to attenuate vibration and transmitted noise in an automotive assembly, provides improved vehicle handling and ride comfort.

The inventive composite bushing, according to the first embodiment hereof, is an assembly including two co-axial outer and inner sleeve members. The outer and inner sleeve members are separated in the radial direction to define an annular space therebetween. A resilient composite elastomeric annulus is positioned within the annular space. The annulus is radially sectioned so as to include a plurality of wedge-shaped portions. The wedge-shaped portions are circumferentially contiguous, and arranged to form an elastomeric ring to substantially fill the space between the outer and inner sleeve members. Individual wedge portions are provided having specific resiliency and assembled with other wedge portions, of which at least one wedge portion is formed having a different resiliency.

In a particular embodiment of the instant invention, a composite cylindrical annulus comprising four wedge portions is provided, wherein adjacent wedge portions are of different resiliency and are disposed in abutting relation with their respective centers disposed at a 90° angle to one another. In this embodiment, wedge portions which are diametrically opposed are formed of the same elastomeric material, and thus possess the same resistance to deflection. Thus, a first pair of wedge portions, having a first resiliency, are disposed on opposed sides of the inner sleeve member, and a second pair of wedge portions, having a second resiliency, are also disposed on opposed sides of the inner sleeve member so as to lie between and separate the individual wedge portions of the first pair of wedge portions.

In the particular embodiment described herein, a first pair of the two pairs of opposed elastomeric wedge portions is bonded to both the inner surface of the outer sleeve and the outer surface of the inner sleeve, so as to form a bushing body. Each wedge portion of the remaining pair of wedge portions is attached at one end to an elastomeric disk of suitable thickness so as to form a bushing insert.

In assembling the described bushing, the bushing insert is slidably inserted into the vacant space remaining between the outer and inner sleeves of the bushing body to form a closed end composite annulus. The bushing insert may be bonded to the bushing body, if desired, using a suitable adhesive.

Optionally, the elastic disk of the bushing insert may be configured to fit inside of the outer sleeve, and after the bushing insert is fully inserted in the bushing body, the end of the outer sleeve may be crimped or swaged inwardly, in order to retain the bushing insert in the bushing body.

DETAILED DESCRIPTION OF THE PREFERRED EMBODIMENTS

A number of selected illustrative embodiments of the present invention will be described, with reference to the drawings.

Figure 1:
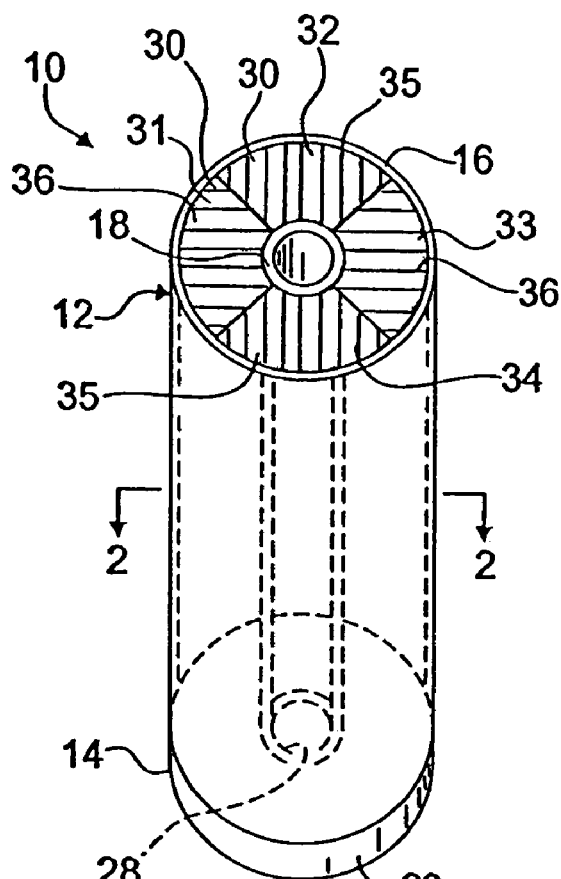
FIG. 1 is perspective view of a composite bushing according to a first illustrative embodiment of the invention, having an elastomeric annulus which is radially sectioned to provide wedge-shaped elastic members of differing resiliency to provide a bushing having circumferentially varying elastic properties.
Figure 2:
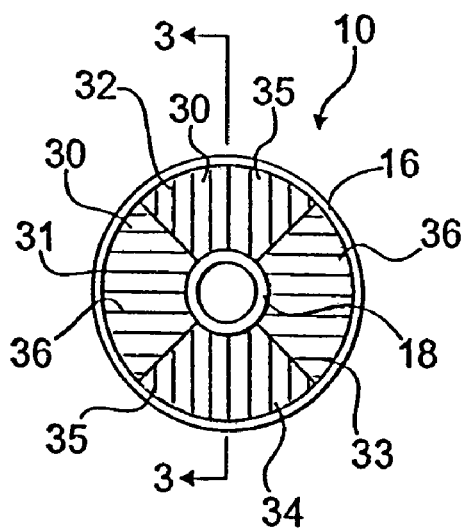
FIG. 2 is a cross sectional view of the inventive bushing of FIG. 1 as seen across line 2-2 in FIG. 1, showing the sectioned elastomeric annulus disposed between an inner sleeve and and outer sleeve.
Figure 3:
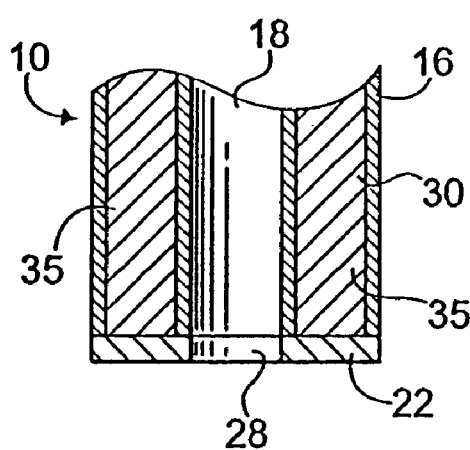
FIG. 3 is partial cross sectional view of one end of the inventive bushing as seen across line 3-3 in FIG. 2, showing the elastomeric disc which closes this end of the bushing.
Figure 4:
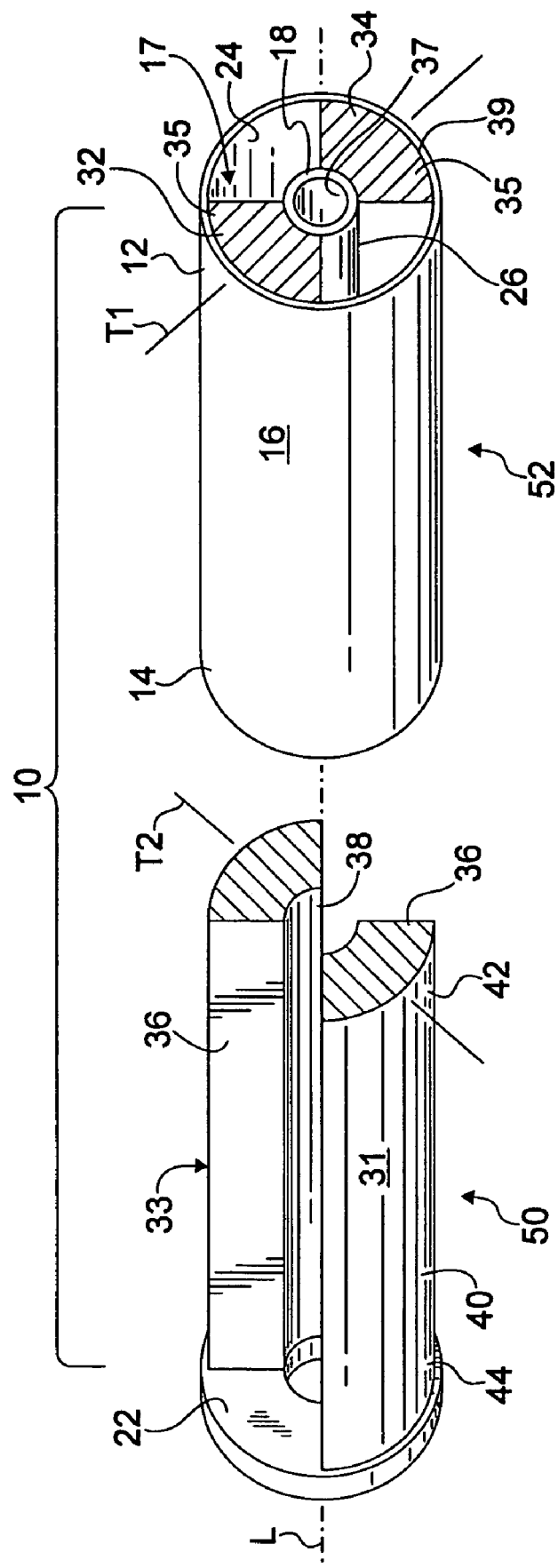
FIG. 4 is an exploded perspective view of the inventive bushing showing the bushing insert separated from the bushing body.
Figure 5:
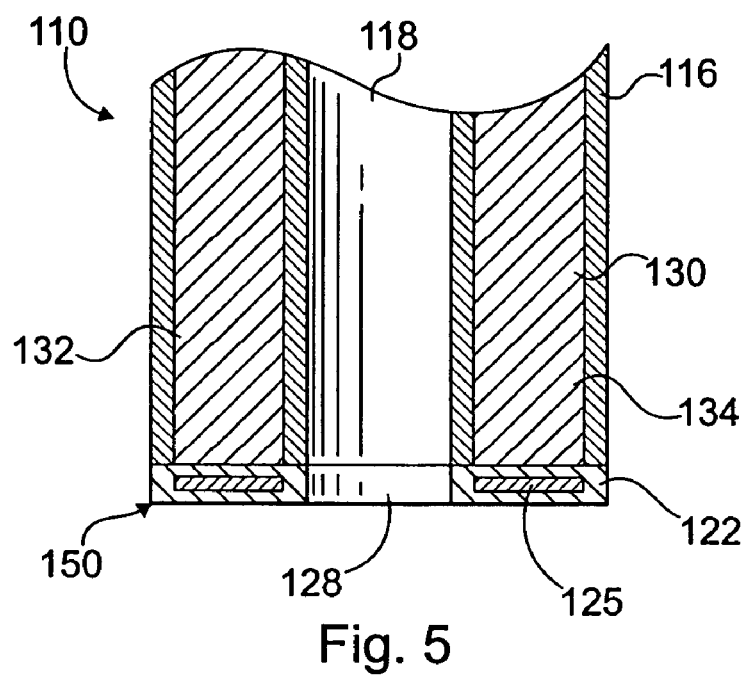
FIG. 5 is a partial cross sectional view, similar to FIG. 3, of one end of a second embodiment of the inventive bushing as seen across line 3-3 in FIG. 2, showing the elastomeric disc having a central reinforcing metal washer therein.
Figure 6:
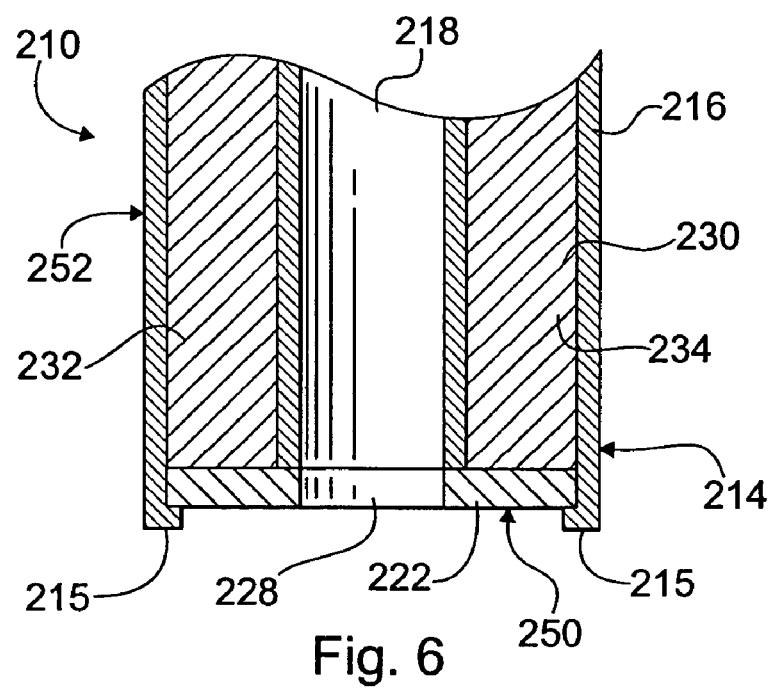
FIG. 6 is partial cross sectional view of one end of a third embodiment of the inventive bushing as seen across line 3-3 in FIG. 2, showing an elastomeric disc configured to fit inside the outer sleeve, and showing the end of the outer sleeve swaged to retain the bushing insert therein.

In each of FIGS. 1 through 4, according to instant invention; there is shown an embodiment of a radially segmented composite elastomeric bushing 10 characterized by directionally dependent resistances to deflection. Further embodiments are illustrated in FIGS. 5 and 6.

More specifically, in the first illustrative embodiment of FIGS. 1-4, the present invention provides a composite bushing 10, in which the spring rate, or resistance to deflection in a first radial direction appreciably differs from the spring rate or resistance to deflection in a second radial direction that is at an angle to the first radial direction, to improve vehicle handling and ride comfort.

The inventive composite bushing 10 includes a rigid, axially elongated hollow cylindrical outer sleeve 16, and a rigid, axially elongated hollow cylindrical inner sleeve 18 disposed concentrically within the outer sleeve 16. The outer sleeve 16 and the inner sleeve 18 are radially separated and spaced apart from each other, to define an annular space 17 therebetween (FIG. 4). The sleeves 16, 18 are preferably formed from metal, such as iron, steel, or any suitable high-strength alloy.

An elongated composite elastomeric annulus 30 is provided within the annular space 17 between the cylindrical surfaces of the inner sleeve 18 and the outer sleeve 16. The elastomeric annulus 30 is interposed between the outer sleeve 16 and inner sleeve 18 so as to substantially fill the annular space 17.

The annulus 30 includes an open end portion 42, and a closed end portion 44 (FIG. 4). The annulus 30 is radially segmented into a plurality of elongated elastomeric wedge portions 31, 32, 33, 34, which are generally wedge-shaped in cross section, and which are substantially circumferentially contiguous to each other within the annular space.

Individual wedge portions 31, 32, 33, 34, are provided in pairs 35, 36 such that each wedge portion within a wedge portion pair 35, 36 has the same resiliency. However, the resiliency of the wedges 32, 34 in a first wedge portion pair 35 is different than the resiliency of the wedges 31, 33 in a second wedge portion pair 36. Each wedge portion within a wedge portion pair 35, 36 is disposed about the longitudinal axis L of the bushing such that it is aligned with, and on opposed sides of the inner sleeve 18 from its pair mate. Thus, the diametrically opposed wedge portions within a pair 35 or 36 are formed of the same elastomeric material, and thus possess the same resistance to deflection. However, adjacent abutting wedge portions such as 31 and 32, for example, are formed from different materials.

Further, the bushing 10 provides a resistance to deflection corresponding to the resiliency of the wedge portion pair in a direction corresponding to central plane of symmetry of the wedge portion pair.

Plural wedge portion pairs 35, 36 are provided, each pair having a specific, unique resiliency. The plural wedge portion pairs 35, 36 are assembled so as to be substantially contiguous with the adjacent wedge portion pairs, to form a circumferentially continuous annular body 30 having radial directionally dependent deflection resistance.

In the particular embodiment of the instant invention illustrated in FIGS. 1-4, the composite annulus 30 is made up of two wedge portion pairs 35, 36, or having a total of four wedge portions 31, 32, 33, 34. However, it is within the scope of this invention to provide a composite annulus 30 having three or more wedge portion pairs. In this particular embodiment, the first wedge portion pair 35 has a first resiliency or hardness, and the second wedge portion pair 36 has a second resiliency which is different from the first resiliency. The first wedge portion pair 35 has a central plane of symmetry disposed at a 90° angle in relation to a central plane of symmetry of the second wedge portion pair 36.

Thus, in the embodiment of FIGS. 1-4, a first pair 35 of wedge portions 32, 34, having a first resiliency, are disposed on opposed sides of the inner sleeve 18, and a second pair 36 of wedge portions 31, 33, having a second resiliency, are also disposed on opposed sides of the inner sleeve 18, but are positioned so as to lie between the individual wedge portions 32, 34 of the first pair of wedge portions 35. This configuration results in bushing 10 which, in use, provides two different elastic responses oriented at 90 degrees to each other.

Material selection is used to determine the resiliency of a wedge portion pair 35, 36. For the purpose of illustrating this embodiment of the invention, the two elastomeric materials used in the instant invention are referred to as high-tan-delta and low-tan-delta materials, respectively, to reflect differing elasticities therein. The high-tan-delta elastomer wedge portions are employed to achieve improved ride comfort, while the low-tan-delta elastomer wedge portions are provided to offer an ease in handling with a smoother maneuvering of the vehicle.

However, it is within the scope of this invention to form the bushings having wedge portions formed of materials having alternative elasticities, or alternatively, to form the bushings having wedge portions formed of elastomeric materials other than rubber.

The inventive bushing is assembled by inserting a bushing insert 50 into a bushing body 52 (FIG. 4).

The bushing body 52 is formed as follows: A first pair of wedge portions, such as first wedge portion pair 35, of the two provided pairs of wedge portions 35, 36, is formed by injecting uncured elastomeric material between the sleeves 16, 18 using suitable dividers to limit distribution of the material, and this uncured material is cured in place between the inner and outer sleeves.

It will therefore be understood that each wedge 32, 34 of the first wedge portion pair 35 is bonded to the sleeves 16, 18 during vulcanization or curing of the material, to form the bushing body 52 as a substantially integral composite member.

Specifically, for each wedge 32, 34 of the first wedge portion pair 35, a wedge portion inner surface 37 is bonded to the outer surface 26 of the inner sleeve 18 during curing of the wedge, and the wedge portion outer surface 39 is bonded to the inner surface 24 of the outer sleeve 16 during curing of the wedge.

Each wedge 32, 34 of the first wedge portion pair 35 has a central plane of symmetry which is aligned with a first axis T1, with the respective wedges disposed on opposite sides of the inner sleeve 18. The resulting structure is a bushing body 52, in which two elastomeric wedges 32, 34 are adhesively secured between the inner sleeve 18 and the outer sleeve 16, and in which vacant openings exist between the opposed wedges.

Alternatively, the wedges 32, 34 of the first portion pair 35 may be formed and cured separately from the sleeves 16, 18, and then may be subsequently post-bonded to the sleeves, using a suitable adhesive.

The bushing insert 50 is formed by securing the remaining, or second, wedge portion pair 36 to one side of a hollow elastomeric disc 22. The insert 50 may be molded as a single, integral one-piece member out of a selected elastomer, including the disc 22 and the wedges 32.

In the first embodiment hereof, the disc 22 has an outer diameter sized to conform to the outer diameter of the outer sleeve 16, and includes a central opening 28 aligned with and sized to conform to the inner diameter of the inner sleeve 18. The bushing insert 50 may be formed by bonding one end 44 of each wedge portion 31, 33 of the second wedge portion pair 36 to one side of the disc 22, such that the wedge portion outer surface 40 lies adjacent the outer periphery of the disc 22, and the wedge portion inner surface 38 lies adjacent to the central opening 28 of the disc 22. Further, each wedge 31, 33 of the second wedge portion pair 36 has a common plane of symmetry which is aligned with a second axis T2, so that the wedges are situated on opposite sides of the central opening 28. It will be noted that the second axis T2 is substantially transverse to the first axis T1.

The bushing insert 50 and the bushing body 52 are assembled by positioning the respective components such that the first axis T1 is oriented at an angle of 90° to the second axis T2. The bushing insert 50 is then slidably inserted into the bushing body 52, such that wedges 31, 33 of the second wedge portion pair 36, respectively reside within the vacancies in the bushing body 32. When fully inserted, the disc 22 abuts one end 14 of the outer sleeve 16 to provide a closed end. At the opposing end 12 of the outer sleeve, the terminal ends 42 of the wedges 32 are not covered, and extend to lie substantially flush with terminal end 42. If desired, a suitable adhesive may be used to affix the bushing insert 50 and the bushing body 52, to maintain the assembled configuration of the bushing 10.

A second embodiment of a bushing 110 according to the present invention is illustrated in FIG. 5, in which the disk 22 is replaced with a reinforced disk 122. The bushing 110 in this second embodiment is a modified version of the bushing 10 as previously described. In will be understood that unless features of the bushing 110 are specifically described as being different from the bushing 10, they are the same as those features previously described.

The bushing 110 includes inner and outer sleeves 118, 116, respectively, having opposed wedge portions 132, 134 therein and forming part of an elastomeric annulus 130.

The reinforced disc 122 shown in FIG. 5 is substantially similar to the disk 22 according to the first embodiment, except that it is provided with a centrally located reinforcing metal washer 125 cast in place therein and surrounding the central opening 128, to strengthen and reinforce the bushing insert 150.

A third embodiment of a bushing 210 according to the present invention is illustrated in FIG. 6. The bushing 210 in this third embodiment is a modified version of the bushing 10 of FIGS. 1-4 as previously described. In will be understood that unless features of the bushing 210 are specifically described as being different from the bushing 10, they are the same as those features previously described.

The bushing 210 includes inner and outer sleeves 218, 216, respectively, having opposed wedge portions 232, 234 therein and forming part of an elastomeric annulus 230.

In the embodiment shown in FIG. 6, an alternative structure for the first end 214 of the outer sleeve 216 is provided, in which the disc 222 may be dimensioned to fit inside of the outer sleeve 216, and the outer sleeve 216 may be made long enough to extend beyond the inner sleeve 218 and to cover the outer peripheral side edge of the disc 222. In this configuration, the outer sleeve 216 may have the terminal end portion 215 thereof swaged or crimped in place about the outside peripheral side edge of the disc 222, to retain the bushing insert 250 inside of the bushing body 252.

Although the presently contemplated embodiment of a circumferentially sectioned composite bushing has been described herein, the foregoing description is intended to illustrate, rather than to limit the invention. Those skilled in the art will recognize that various substitutions and modifications can be made, without departing from the invention. For example, other connecting members besides the disc 22 could be used to interconnect the wedge portions 31, 33 of the bushing insert 50, or thin partitions could be placed between adjacent wedge portions to create a separation therebetween. All such modifications, which are within the scope of the appended claims, are intended to be within the scope and spirit of the present invention.

What is claimed is:

1. A composite bushing for a vehicle, said bushing comprising an inner sleeve, an outer sleeve, and an elastomeric body which fits between the inner and outer sleeves, wherein:

the inner sleeve is positioned coaxially within the outer sleeve such that the outer sleeve surrounds the inner sleeve, and such that an annular space is formed therebetween;

the elastomeric body resides within the annular space, wherein the elastomeric body comprises plural substantially wedge-shaped elastic segments, wherein each elastic segment of the plural elastic segments extends between the inner sleeve and the outer sleeve, and the plural elastic segments are circumferentially arranged within the annular space so as to be substantially contiguous with one another, wherein adjacent elastic segments of the plural elastic segments comprise materials having different resiliency, and wherein the elastomeric body further comprises a resilient connecting member which is integrally formed with, and which interconnects two of the elastic segments at one end of the bushing.

2. The composite bushing of claim 1, wherein the plural elastic segments comprise plural elastic segment pairs, wherein both elastic segments of an elastic segment pair comprise materials having substantially the same resiliency, and wherein the two elastic segments which comprise an elastic segment pair are situated on opposite sides of the inner sleeve.

3. The composite bushing of claim 2, wherein a first elastic segment pair of the plural elastic segment pairs comprises a material having a resiliency which is different than that of a second elastic segment pair.

4. The composite bushing of claim 1, wherein the plural elastic segments comprise two elastic segment pairs, wherein the two elastic segments which comprise an elastic segment pair comprise materials having substantially the same resiliency and are positioned in alignment on opposite sides of the inner sleeve, wherein the two elastic segment pairs substantially fill the annular space, and wherein the first elastic segment pair comprises a first material having a first resiliency, and the second elastic segment pair comprises a second material having a second resiliency which is different from the first resiliency.

5. The composite bushing of claim 4, wherein the first elastic segment pair defines a first central plane of symmetry, and wherein the second elastic segment pair defines a second central plane of symmetry which is oriented substantially transverse to the first central plane of symmetry.

6. The composite bushing of claim 1, wherein some of the elastic segments of the plural elastic segments comprise a first material having a first resiliency, wherein others of the elastic segments comprise a second material having a second resiliency which is different from the first resiliency, and wherein the elastic segments are arranged within the annular space such that the resiliency of the segments alternates circumferentially.

7. The composite bushing of claim 1, wherein the plural elastic segments comprise four elastic segments, wherein two of said elastic segments comprise a first material having a first resiliency, wherein two of said elastic segments comprise a second material having a second resiliency which is different from the first resiliency, and wherein the elastic segments are arranged within the annular space such that the resiliency of the segments alternates circumferentially.

8. The composite bushing of claim 1, wherein the connecting member has a metal reinforcing washer disposed therein.

9. A composite bushing for a vehicle, said bushing comprising an inner sleeve, an outer sleeve, and an elastomeric body which fits between the inner and outer sleeves, wherein:
the inner sleeve is positioned coaxially within the outer sleeve such that the outer sleeve surrounds the inner sleeve, and such that an annular space is formed therebetween;
the elastomeric body resides within the annular space,
wherein the elastomeric body comprises plural substantially wedge-shaped elastic segments, wherein each elastic segment of the plural elastic segments extends between the inner sleeve and the outer sleeve, and the plural elastic segments are circumferentially arranged within the annular space so as to be substantially contiguous with one another,
wherein the plural elastic segments comprise four elastic segments, wherein two of said elastic segments comprise a first material having a first resiliency, wherein two of said elastic segments comprise a second material having a second resiliency which is different from the first resiliency, and wherein
the two elastic segments comprising the first material are situated on opposing sides of the inner sleeve and are bonded to both the inner sleeve and the outer sleeve, and
the two elastic segments comprising the second material are also situated on opposing sides of the inner sleeve, and are interconnected at one end by an integral connecting member which is also formed from the second material.

10. The composite bushing of claim 9, wherein the connecting member has a metal reinforcing washer disposed therein.

11. A composite bushing for a vehicle, said bushing comprising an inner sleeve, an outer sleeve, and an elastomeric body, wherein:
the inner sleeve is positioned coaxially within said outer sleeve such that the outer sleeve surrounds the inner sleeve, and such that an annular space is formed therebetween,
the elastomeric body resides within the annular space, and the elastomeric body comprises:
four substantially wedge-shaped elastic segments, wherein adjacent elastic segments comprise different materials having different resiliency, and
a resilient connecting member which is integrally formed with, and which interconnects two of the elastic segments at one end of the bushing.

12. The composite bushing of claim 11, wherein the outer sleeve is crimped at one end thereof to help retain selected segments therein.

13. The composite bushing of claim 11, where the four elastic segments comprise a first pair of elastic segments and a second pair of elastic segments, wherein
the first pair of elastic segments comprise a first material having a first resiliency, the elastic segments which comprise the first pair of elastic segments are substantially diametrically opposed within the outer sleeve, and are bonded to the inner sleeve, and
the second pair of elastic segments comprises a second material having a second resiliency, the elastic segments which comprise the second pair of elastic segments are substantially diametrically opposed within the outer sleeve,
and wherein the resilient connecting member interconnects the second pair of elastic segments at said one end of the bushing.

14. The composite bushing of claim 11, wherein the connecting member has a metal reinforcing washer disposed therein.

15. A composite bushing for a vehicle, said bushing comprising an inner sleeve, an outer sleeve, and an elastomeric body, wherein
the inner sleeve is positioned coaxially within said outer sleeve such that the outer sleeve surrounds the inner sleeve, and such that an annular space is formed between the inner sleeve and the outer sleeve,
wherein the elastomeric body resides within the annular space, and comprises a plurality of materials therein having different resiliency, such that the bushing is adapted to provide a directionally dependent response to an applied radial load,
wherein the elastomeric body comprises a plurality of elastic members, wherein adjacent elastic members of said plurality of elastic members comprise materials having different resiliency,
and wherein the elastomeric body further comprises a resilient connecting member which is integrally formed with, and which interconnects two of the elastic members at one end of the bushing.

16. The composite bushing of claim 15, wherein the elastomeric body responds to a load applied thereto in a first radial direction with a first resiliency, responds to a load applied thereto in a second radial direction with a second resiliency, wherein the second radial direction is oriented at an angle relative to the first radial direction.

17. The composite bushing of claim 16, wherein the angle is in a range between 60 and 120 degrees.

18. The composite bushing of claim 16, wherein the elastomeric body is radially segmented and wherein said elastic members which are arranged substantially contiguously and circumferentially within the annular space.

19. The composite bushing of claim 16, wherein the elastomeric body is radially segmented and wherein said plurality of elastic members comprises four elastic members which are arranged substantially contiguously and circumferentially within the annular space.

20. The composite bushing of claim 15, wherein the connecting member has a metal reinforcing washer disposed therein.

* * * * *